Sept. 24, 1963    K. SCHWARTZWALDER    3,104,917
BEARING
Filed May 17, 1961

INVENTOR.
Karl Schwartzwalder
BY
Paul J. Reising
ATTORNEY

3,104,917
BEARING

Karl Schwartzwalder, Holly, Mich., assignor to General Motors Corporation, Detroit, Mich., a corporation of Delaware
Filed May 17, 1961, Ser. No. 110,693
8 Claims. (Cl. 308—9)

This invention relates to bearings and more particularly to precision bearings such as find particular utility in gyros and other components for guidance and instrumentation systems. It has as its principal object the provision of an improved, durable precision bearing having a considerable amount of inherent lubricity. More specifically, it is an object of the invention to provide a precision, light duty bearing wherein the material of at least one of the bearing elements is such that the bearing has inherent lubricity along with excellent wear resistance and durability.

Briefly, these objects are accomplished in accordance with the invention by the provision of a bearing wherein at least the surface portions of one or more of the elements thereof are formed of a material selected from the group consisting of barium fluoride, calcium fluoride, strontium fluoride, and magnesium fluoride, magnesium fluoride being much preferred. The entire element can be formed of the material as, for example, by a hot pressing operation followed by grinding and polishing, or the element can be made of metal, polished and then coated with a thin layer of the material. Where light weight is desired, as is the case where the bearing is intended for use in a missile guidance system gyro or other component, beryllium has particular advantage as the base metal for the element.

The above and other objects, advantages and features of the invention will appear more clearly from the following description of various embodiments thereof made with reference to the accompanying drawings in which.

Figure 1:
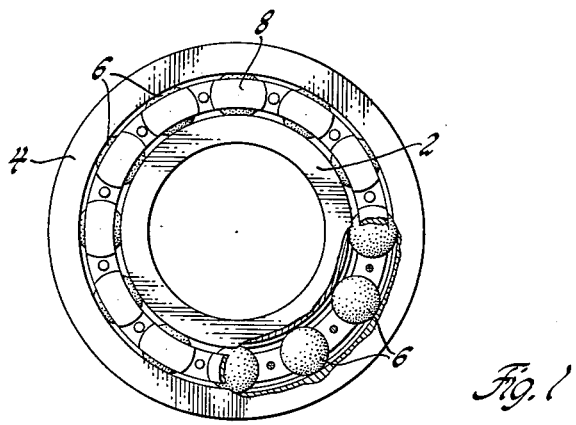
FIGURE 1 is a side view of a ball bearing assembly embodying the invention.

Referring now to FIGURE 1, the ball bearing shown comprises inner and outer metal races 2 and 4, respectively, and ball elements 6 between the races maintained separated from each other by cage 8. The ball elements are made of magnesium fluoride and by reason of their being made of this material have a high degree of inherent lubricity. In manufacturing the bearing the ball elements can be formed by hot pressing powdered magnesium fluoride at about 1000° C. and about 500 to 5000 p.s.i. pressure, and then ground and polished by conventional techniques. If desired, the ball elements, instead of consisting entirely of magnesium fluoride, can comprise a polished metal ball formed by conventional techniques and subsequently coated with a thin layer of magnesium fluoride. The thin magnesium fluoride layer can be accomplished by supporting the metal ball elements in an evacuated chamber in which magnesium fluoride is vaporized such that it condenses on the surfaces of the metal ball elements.

It will be understood that while, in the embodiment described above, only the ball elements are of magnesium fluoride, the inner and outer races may, in accordance with the invention, be formed or have a surface coating of magnesium fluoride.

Figure 2:
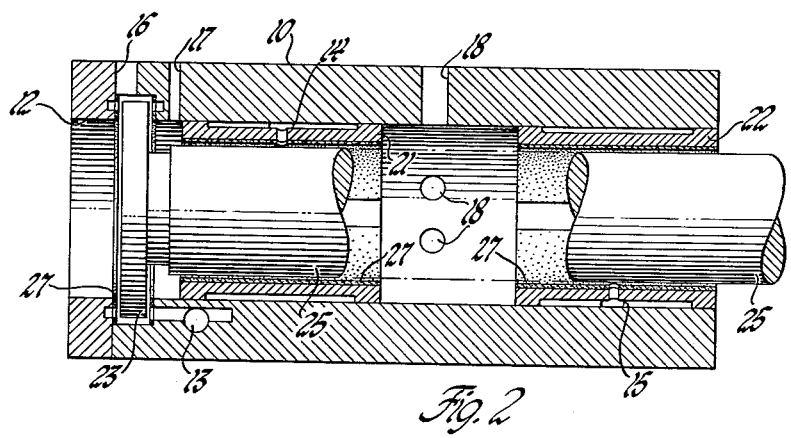
FIGURE 2 is a sectional view of a pneumatic bearing incorporating the invention.

In FIGURE 2 there is shown a pneumatic bearing embodying the invention. The particular bearing illustrated is of the type covered by United States Patent 2,756,115 issued July 24, 1956, to R. O. Michel, assigned to the assignee of the present invention, and includes a casing 10 having a throughbore 12 with a plurality of pressurized air inlet ports 13, 14 and 15 and a plurality of exhaust ports 16, 17 and 18. Disposed within the throughbore are a pair of axially spaced bushings 21 and 22 the inner surfaces of which constitute bearing surfaces. A shaft 25 which might, for example, be the shaft of an electric motor or a gyro, fits relatively snugly within the hollow bushings 21 and 22 with only sufficient clearance therebetween to provide space for a film of compressed air about portions of the shaft. An annular flange portion 23 of the shaft fits into a mating channel portion in the casing 10, the opposed end surfaces of the flange portion and the casing constituting a thrust bearing. Hence, the particular structure shown is both a radial bearing and a thrust bearing.

In accordance with the present invention, the inner surfaces of the bushings 21 and 22 and the casing inner surfaces to each side of the shaft flange portion 23 are provided with a thin coating 27 of magnesium fluoride. This coating, which is shown with exaggerated thickness in FIGURE 2, substantially eliminates what has been one of the major problems with gas bearings, to wit, the binding and scoring which occurs between the contacting bearing elements during start-up and during slow-down when the gas pressure is not sufficient to maintain the elements separated.

Figure 3:
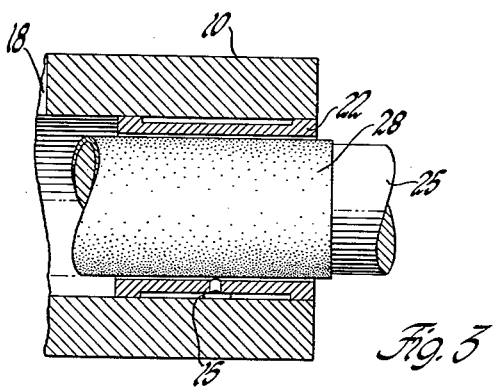
FIGURE 3 is a view in partial section and with parts broken away of a modification of the bearing shown in FIGURE 2.

The coating may, if desired, be applied to the shaft instead of or in addition to being applied to the bushings and casing. This is illustrated in FIGURE 3 which shows a bearing identical to that in FIGURE 2 except that the magnesium fluoride coating is applied to the shaft as shown at 28.

The particular pneumatic bearing shown in FIGURE 2 is of the so-called hydrostatic type wherein the gas support is supplied by suitable gas pressure means through ports in the bearing casing. However, the invention can also be used in the so-called hydrodynamic type gas bearing wherein the structure and rotary speed of the one bearing element is such as to create air pressure sufficient to support that element. In such an embodiment, at least the surface portions of one or more of the bearing elements which are in contact prior to and during gas pressure build-up are formed of one of the aforementioned fluorides, preferably magnesium fluoride.

It will be understood that while the invention has been described particularly with reference to certain embodiments thereof, it is not so limited since changes and modifications may be made, all within the full and intended scope of the claims which follow.

I claim:

1. A bearing comprising a pair of elements in moving surface contact with each other, the contacting surface of at least one of said elements being of a material selected from the group consisting of magnesium fluoride, strontium fluoride, barium fluoride and calcium fluoride.

2. A bearing comprising a pair of elements in moving surface contact with each other, the contacting surface of at least one of said elements being formed of magnesium fluoride.

3. A bearing comprising a pair of elements in moving surface contact with each other, at least one of said elements being formed of a material selected from the group consisting of magnesium fluoride, strontium fluoride, barium fluoride and calcium fluoride.

4. A bearing comprising a pair of elements in moving surface contact with each other, at least one of said elements being formed of magnesium fluoride.

5. A bearing comprising a pair of elements in moving surface contact with each other, at least one of said elements being formed of a metal member having a coating of a material selected from the group consisting of magnesium fluoride, strontium fluoride, barium fluoride and calcium fluoride.

6. A bearing comprising a pair of elements in moving surface contact with each other, at least one of said elements being formed of a metal member having a coating of magnesium fluoride.

7. A pneumatic bearing comprising a pair of elements with opposed surfaces movable with respect to each other, at least one of said elements having its surface formed of a material selected from the group consisting of magnesium fluoride, strontium fluoride, barium fluoride and calcium fluoride, and means for creating gas pressure between the opposed surfaces of said elements to cause separation thereof.

8. A pneumatic bearing comprising a pair of elements with opposed surfaces movable with respect to each other, at least one of said elements having its surface formed of magnesium fluoride, and means for creating gas pressure between the opposed surfaces of said elements to cause separation thereof.

References Cited in the file of this patent

UNITED STATES PATENTS 2,756,115    Michel _____ July 24, 1956

FOREIGN PATENTS 480,332    Great Britain _____ Feb. 21, 1938

OTHER REFERENCES

Comprehensive Treatise on Inorganic and Theoretical Chemistry, vol. 3, pub. 1923, by Longmans, Green & Co.